United States Patent
Gay et al.

(10) Patent No.: US 10,216,403 B2
(45) Date of Patent: Feb. 26, 2019

(54) METHOD TO UNLOCK A SCREEN USING A TOUCH INPUT

(71) Applicant: Orange, Paris (FR)

(72) Inventors: Julian Gay, San Francisco, CA (US); Guillaume Payan, San Francisco, CA (US); Boris Henriot, San Francisco, CA (US)

(73) Assignee: ORANGE, Paris (FR)

( * ) Notice: Subject to any disclaimer, the term of this patent is extended or adjusted under 35 U.S.C. 154(b) by 321 days.

(21) Appl. No.: 14/781,250

(22) PCT Filed: Mar. 26, 2014

(86) PCT No.: PCT/IB2014/000571
§ 371 (c)(1),
(2) Date: Sep. 29, 2015

(87) PCT Pub. No.: WO2014/155196
PCT Pub. Date: Oct. 2, 2014

(65) Prior Publication Data
US 2016/0054884 A1    Feb. 25, 2016

Related U.S. Application Data

(60) Provisional application No. 61/806,469, filed on Mar. 29, 2013.

(51) Int. Cl.
*G06F 3/033*    (2013.01)
*G06F 3/0488*    (2013.01)
(Continued)

(52) U.S. Cl.
CPC .......... *G06F 3/0488* (2013.01); *G06F 3/0484* (2013.01); *G06F 3/04883* (2013.01);
(Continued)

(58) Field of Classification Search
CPC ... G06F 3/0488; G06F 3/0484; G06F 3/04883
See application file for complete search history.

(56) References Cited

U.S. PATENT DOCUMENTS

| 6,075,895 A | 6/2000 | Qiao et al. |
| 6,747,676 B2 * | 6/2004 | Botz ........................ G06F 21/31 715/741 |

(Continued)

FOREIGN PATENT DOCUMENTS

| EP | 2458525 A1 | 5/2012 |
| WO | 2007089766 A2 | 8/2007 |

OTHER PUBLICATIONS

Office Action dated Aug. 24, 2016 from the United States Patent & Trademark Office for corresponding U.S. Appl. No. 14/316,328, filed Jun. 26, 2014.

(Continued)

*Primary Examiner* — Nicholas Augustine
(74) *Attorney, Agent, or Firm* — David D. Brush; Westman, Champlin & Koehler, P.A.

(57) ABSTRACT

A computer-implemented method is provided for executing an action on an electronic device. The method includes outputting, at a touch screen of the mobile device, a lock screen view configured to prevent unauthorized or inadvertent access to the electronic device. The access is conditioned to a predefined shape of a user touch input. The method further includes, while the lock screen view is displayed at the touch screen, detecting, at the touch screen, a touch input having a first shape, verifying if the first shape has the predefined shape, in response to detecting that the touch input has the predefined shape, executing, by the electronic device, a particular action determined, at least in part on the predefined shape, if detecting a further touch input at least prior or subsequent the predefined shape.

12 Claims, 6 Drawing Sheets

(51) Int. Cl.
*G06F 21/36* (2013.01)
*H04W 12/06* (2009.01)
*G06F 3/0484* (2013.01)
*H04M 1/725* (2006.01)
*G06F 3/048* (2013.01)
*H04W 88/02* (2009.01)

(52) U.S. Cl.
CPC ........ *G06F 21/36* (2013.01); *H04M 1/72577* (2013.01); *H04W 12/06* (2013.01); *H04W 88/02* (2013.01)

(56) References Cited

U.S. PATENT DOCUMENTS

| | | | |
|---|---|---|---|
| 8,136,053 B1 | 3/2012 | Miller et al. | |
| 8,532,976 B2* | 9/2013 | Tanaka | A63F 13/02 463/47 |
| 8,639,896 B2* | 1/2014 | Bank | G06F 11/366 711/162 |
| 8,751,972 B2 | 6/2014 | Ouyang et al. | |
| 8,830,181 B1 | 9/2014 | Clark et al. | |
| 9,053,293 B2* | 6/2015 | Latzina | G06F 21/00 |
| 9,245,154 B2* | 1/2016 | Andreasson | G06F 21/83 |
| 9,606,643 B2* | 3/2017 | Aguera-Arcas | G06F 3/03547 |
| 9,619,037 B2* | 4/2017 | St. Clair | G06F 3/017 |
| 9,665,178 B2* | 5/2017 | Bukurak | G06F 3/017 |
| 9,757,645 B2* | 9/2017 | Seo | A63F 13/10 |
| 9,898,642 B2* | 2/2018 | Han | G06K 9/00033 |
| 2010/0248689 A1* | 9/2010 | Teng | H04M 1/67 455/411 |
| 2010/0306718 A1 | 12/2010 | Shim et al. | |
| 2011/0041102 A1* | 2/2011 | Kim | G06F 3/04883 715/863 |
| 2011/0088086 A1* | 4/2011 | Swink | G06F 3/04883 726/7 |
| 2011/0130170 A1* | 6/2011 | Han | G06F 1/1694 455/566 |
| 2011/0187497 A1* | 8/2011 | Chin | G06F 21/00 340/5.54 |
| 2011/0279384 A1* | 11/2011 | Miller | G06F 3/04883 345/173 |
| 2011/0283241 A1* | 11/2011 | Miller | G06F 3/04883 715/863 |
| 2011/0294467 A1* | 12/2011 | Kim | G06F 1/1643 455/411 |
| 2012/0016641 A1 | 1/2012 | Raffa et al. | |
| 2012/0194440 A1 | 8/2012 | Ramrattan et al. | |
| 2012/0262388 A1* | 10/2012 | Huang | G06F 3/04883 345/173 |
| 2012/0313848 A1* | 12/2012 | Galor | G06F 3/005 345/156 |
| 2013/0081133 A1 | 3/2013 | Hetroy | |
| 2013/0111408 A1* | 5/2013 | Berus | G06F 17/30873 715/835 |
| 2013/0160110 A1* | 6/2013 | Schechter | G06F 21/629 726/19 |
| 2013/0187869 A1 | 7/2013 | Rydenhag et al. | |
| 2013/0194206 A1* | 8/2013 | Chang | G06F 3/04883 345/173 |
| 2013/0229367 A1* | 9/2013 | Pinch | G06F 21/36 345/173 |
| 2013/0239058 A1* | 9/2013 | Yao | G06F 3/04883 715/833 |
| 2013/0271360 A1* | 10/2013 | MacDougall | H04M 1/72519 345/156 |
| 2013/0283199 A1* | 10/2013 | Selig | G06F 3/0484 715/781 |
| 2013/0305352 A1* | 11/2013 | Narendra | H04M 1/673 726/19 |
| 2013/0312083 A1* | 11/2013 | Farraro | G06F 3/04883 726/16 |
| 2013/0346921 A1* | 12/2013 | Shiplacoff | G06F 3/0488 715/835 |
| 2014/0002375 A1* | 1/2014 | Rydenhag | G06F 3/04883 345/173 |
| 2014/0033136 A1* | 1/2014 | St. Clair | G06F 3/017 715/863 |
| 2014/0149916 A1 | 5/2014 | Manoff et al. | |
| 2014/0267064 A1* | 9/2014 | Lu | G06F 3/041 345/173 |
| 2014/0325405 A1 | 10/2014 | Smolinski et al. | |
| 2014/0344766 A1 | 11/2014 | Cao et al. | |
| 2015/0043824 A1 | 2/2015 | Akhavan Fomani et al. | |
| 2015/0089449 A1* | 3/2015 | Yeh | G06F 21/00 715/825 |
| 2015/0147065 A1* | 5/2015 | Civelli | G08C 23/04 398/107 |

OTHER PUBLICATIONS

Office Action dated Apr. 5, 2017 from the United States Patent and Trademark Office, for corresponding U.S. Appl. No. 14/316,328, filed Jun. 26, 2014.

International Search Report and Written Opinion dated Jun. 16, 2014 for corresponding International Application No. PCT/IB2014/000571, filed Mar. 26, 2014.

Alon J et al: "A Unified Framework for Gesture Recognition and Spatiotemporal Gesture Segmentation", IEEE Transactions on Pattern Analysis and Machine Intelligence, IEEE Computer Society, USA, vol. 30, No. 9, Sep. 1, 2009 (Sep. 1, 2009), pp. 1685-1699, XP011292685, ISSN: 0162-8828.

European Search Report and Written Opinion dated Nov. 10, 2014 for corresponding European Patent Application No. EP14306018, filed Nov. 10, 2014.

Office Action dated Apr. 27, 2016 from the United States Patent & Trademark Office for corresponding U.S. Appl. No. 14/316,328, filed Jun. 26, 2014.

Advisory Action dated Aug. 1, 2017, for corresponding U.S. Appl. No. 14/316,328, filed Jun. 26, 2014.

Office Action dated Apr. 5, 2018, for corresponding U.S. Appl. No. 14/316,328, filed Jun. 26, 2014.

Final Office Action dated Sep. 5, 2018, for corresponding U.S. Appl. No. 14/316,328, filed Jun. 26, 2014.

Advisory Action dated Nov. 29, 2018, for corresponding U.S. Appl. No. 14/316,328, filed Jun. 26, 2014.

\* cited by examiner

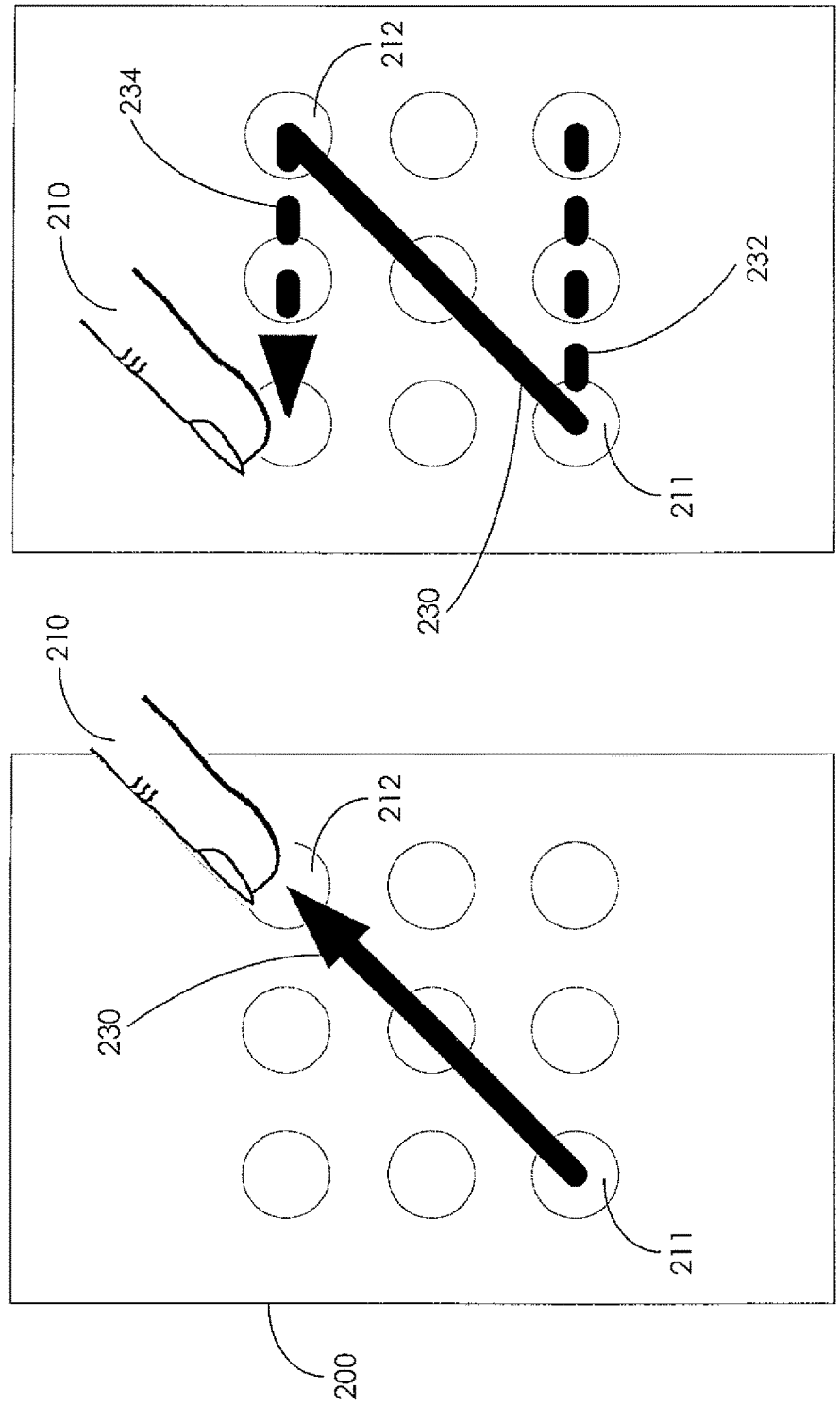

METHOD TO UNLOCK A SCREEN USING A TOUCH INPUT

CROSS-REFERENCE TO RELATED APPLICATIONS

This Application is a Section 371 National Stage Application of International Application No. PCT/IB2014/000571, filed Mar. 26, 2014, the content of which is incorporated herein by reference in its entirety, and published as WO 2014/155196 A1 on Oct. 2, 2014, in English, which claims priority from and the benefit of U.S. Provisional Application No. 61/806,469, filed Mar. 29, 2013.

FIELD OF THE PRESENT SYSTEM

The present invention generally relates to electronic devices, and more specifically to graphical user interfaces displayed by such devices.

BACKGROUND OF THE PRESENT SYSTEM

Mobile handsets have an inherently impoverished graphical user interface (GUI) with respect to desktop computers. Small screens and tiny keyboards are typical of mobile handsets that fit in your pocket. Recent so called smart phones have introduced the use of a touch screen in an attempt to simplify the user experience with his mobile handset. For instance, the touch interface of the iPhone® has revolutionized the mobile handset industry and brought whole new mobile user experiences. Touch-based interfaces have now become common-place through the adoption of smartphone and tablet touch screens.

In existing smart phones, application programs (AP) may be controlled through interactions such as touch inputs. Different touch inputs may control the AP in different ways. For instance, a user touching an AP icon will cause a control of the desktop GUI that will launch the AP corresponding to the touched icon.

A common interaction on a smart phone is to use a continuous, directional gesture or touch input to draw on the touch screen a continuous sequence to unlock the device. Such a known interaction is described in U.S. Pat. No. 8,136,053B1. A lock screen is a Graphical User Interface (GUI) displayed to the user when trying to reuse his electronic device after he activates its lock (screen) mode against unwanted use. An illustration of a known lock screen is displayed in FIGS. 4A-4B.

One implementation uses a series of nine circles form an unlock pattern and are displayed to the user in the lock screen GUI of FIG. 4A. These circles are presented to the user as guides to draw a line with his finger. While configuring the lock screen mode, the user is invited as in FIG. 4B to draw at the touch screen of the electronic device a continuous sequence joining a plurality of the nine circles. The continuous sequence—referred here after as the unlock sequence is characterized by a predefined shape 430 (here illustrated as a W shape). It is saved by the electronic device and will be requested with each user attempt to unlock his device. To facilitate the entry of the unlock sequence, the processor of the device may render a visual feedback (like the thick line 430) to the user by showing a line joining the circles as the user's finger 410 moves across the circles.

When detecting at the touch screen a touch input, the processor of the electronic device, when in the lock mode, will compare the shape of the detected touch input to the predefined shape after the user has discontinued his touch input. Provided the shapes are identical, the processor will unlock the device screen and the user will be able to resume interactions with the electronic device.

A problem with such a solution is that the unlock sequence may be visible to other people. Existing lock modes do not prevent undesired witnesses from seeing the unlock sequence nor being able to repeat it after stealing the electronic device.

Today there is still a need to an improved lock mode for an electronic device such as a smartphone. There is a further need for a lock mode that do not bring additional complexity to the unlocking of the device.

SUMMARY OF THE PRESENT SYSTEM

The present system relates to a computer-implemented method for executing an action on an electronic device, comprising:
  outputting, at a touch screen of the electronic device, a lock screen view configured to prevent unauthorized or inadvertent access to the electronic device; the access being conditioned to a predefined shape of a user touch input,
  while the lock screen view is displayed at the touch screen:
    detecting, at the touch screen, a touch input having a first shape,
    verifying if the first shape comprises the predefined shape,
    in response to detecting that the touch input comprises the predefined shape, executing, by the electronic device, a particular action determined, at least in part on the predefined shape, if detecting further touch input at least prior or subsequent the predefined shape.

Thanks to the present method, the unlock sequence, i.e. the predefined sequence is hidden or obscured in a much longer sequence provided by the user. A longer sequence will be harder to remember for an unwanted witness. Furthermore, the screen may be unlocked only when a longer sequence is detected. Indeed, if the user just enters the unlock sequence, for instance because there is no one around, the screen will not unlock, or a particular action won't be carried out. In other words, the action will be carried out by the electronic device only if the first shape, i.e. the user input, comprises the predefined shape and further touch input.

The present system also relates to an electronic device for executing an action, the electronic device comprising a processor arranged to:
  output, at a touch screen of the electronic device, a lock screen view configured to prevent unauthorized or inadvertent access to the electronic device; the access being conditioned to a predefined shape of a user touch input,
  while the lock screen view is displayed at the touch screen, the processor is further arranged to:
    detect, at the touch screen, a touch input having a first shape,
    verify if the first shape comprises the predefined shape,
    in response to detecting that the touch input comprises the predefined shape, execute a particular action determined, at least in part on the predefined shape, if detecting further touch input at least prior or subsequent the predefined shape.

The present system also relates to an application embodied on a non transitory computer readable storage medium and executable by an electronic device in the form of a software agent including at least one software module comprising instructions to:
    output, at a touch screen of the electronic device, a lock screen view configured to prevent unauthorized or inadvertent access to the electronic device; the access being conditioned to a predefined shape of a user touch input,
    while the lock screen view is displayed at the touch screen:
    detect, at the touch screen, a touch input having a first shape,
    verify if the first shape comprises the predefined shape,
    in response to detecting that the touch input comprises the predefined shape, execute a particular action determined, at least in part on the predefined shape, if detecting further touch input at least prior or subsequent the predefined shape.

BRIEF DESCRIPTION OF THE DRAWINGS

The invention is explained in further detail, and by way of example, with reference to the accompanying drawings wherein:

FIGS. 2A, 2B show lock screen GUIs in accordance with an embodiment of the present electronic device;

DETAILED DESCRIPTION OF THE PRESENT SYSTEM

Figure 1:
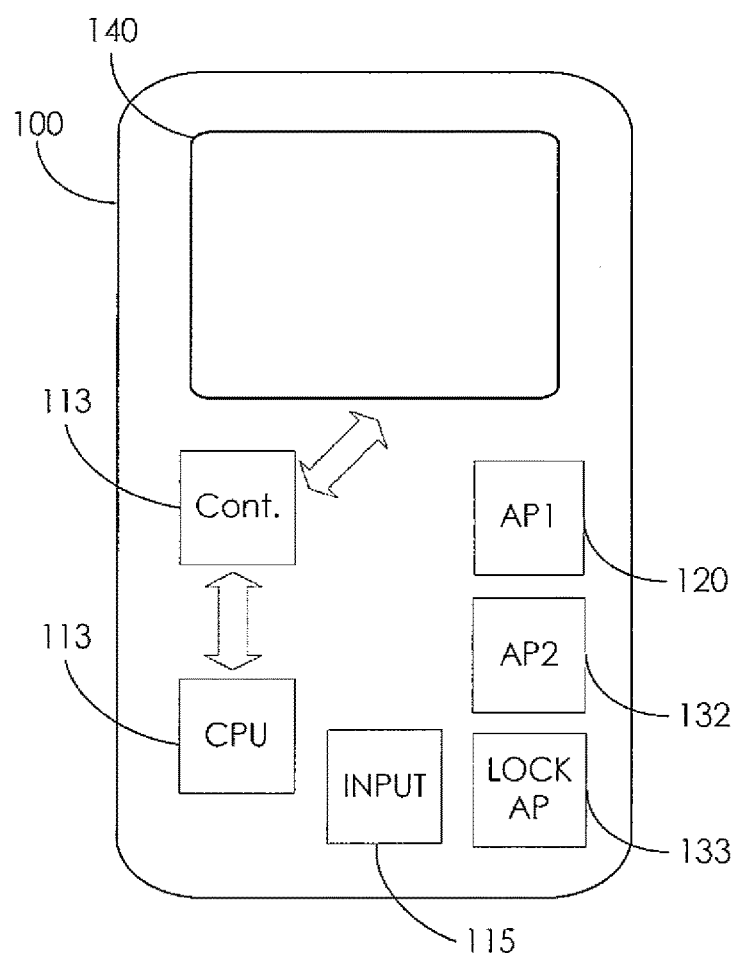
FIG. 1 shows a mobile device in accordance with an embodiment of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. An operative coupling may also include a wired and/or wireless coupling to enable communication between a media content platform and one or more user devices in accordance with an embodiment of the present system. An operative coupling may also relate to an interaction between program portions and thereby may not describe a physical connection so much as an interaction based coupling.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface such as a lock screen on a display device so that it may be seen and interacted with by a user. The term rendering may also comprise all the actions required to generate a GUI prior to the display, like e.g. a map representation generated on a server side for a browser application on a user device.

The system, device(s), method, user interface, etc., described herein address problems in prior art systems. The man skilled in the art may easily apply the present teachings to any electronic device presenting a touch sensitive panel, (referred also hereafter as a touch sensitive display or screen), a pointing device (like a mouse) or a keyboard.

In accordance with an embodiment of the present system, an electronic device provides a lock screen GUI for controlling through user inputs, such e.g. as a continuous gesture, the access to the device. In the description hereafter, reference will be made to a mobile device or handsets. This is in no way a limitation of the present method as the teaching herein may be applied to any electronic device presenting a touch interface.

A graphical user interface (GUI) may be provided in accordance with an embodiment of the present system:
    by an application program running locally on a device processor, such as part of a computer system of a mobile device, and/or,
    as provided by a network connected device or web based server, such as a content server providing content to the user device, the GUI being rendered on user device through a local application program (e.g. a browser or web application) connected to media content server.

For instance, the present GUI enabling the lock screen mode may be generated by generating locally a lock screen GUI. Alternatively, the present GUI may be the rendering by a local AP of a preprocessed lock interface. The provided visual environment may be displayed by the processor on a display device of the user device, e.g. a touch sensitive panel (touch panel in short), which a user may use to provide a number of touch inputs such as a continuous touch input.

A GUI is a type of user interface which allows a user to interact with electronic devices such as computers, handheld devices such as smartphones or tablets, household appliances, office equipment and the likes. GUIs are typically used to render visual and textual images which describe various visual metaphors of an operating system, an application, etc., and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars, maps, etc. Such images can be arranged in predefined layouts, or can be created dynamically (by the device itself or by a web-based server) to serve the specific actions being taken by a user. In general, the user can select and/or activate various graphical images in order to initiate functions and tasks, i.e. controls, associated therewith. By way of example, a user can select a button that opens, closes, minimizes, or maximizes a window, a virtual representation or an icon that launches a particular application program. By way of another example, the GUI may present a typical user interface including a windowing environment and as such, may include menu items, pull-down menu items, icons, pop-up windows, etc., that are typical of those provided in a windowing environment, such as may be represented within a Windows™ Operating System GUI as provided by Microsoft Corporation and/or an OS X™ Operating System GUI, such as provided on an iPhone™, MacBook™, iMac™, etc., as provided by Apple, Inc., and/or another operating system (OS).

In the description here after, an application program (AP)—or software—may be seen as any tool that functions and is operated by means of a computer, with the purpose of performing one or more functions or tasks for a user or another application program. To interact with and control an AP, a GUI of the AP may be displayed on the user device display.

A lock screen is a user interface used by various operating systems to regulate immediate access to a device by requiring that the user performs a certain action in order to receive access. The action may be one of entering a password, using a certain button combination, or by performing a certain continuous gesture using the device's touch screen. In the hereafter description, reference will be made to a lock screen (mode) using a continuous gesture to to unlock.

FIG. 1 is an illustration of an exemplary user device 100 used in the present system. In the here after description, the user or electronic device will be illustrated as a mobile device 100 with a touch interface. This illustration is in no way limiting as the present teaching would work for any user devices such as laptops, pads, desktops and the likes, enabling the user to interact through a touch interface, a pointing device and/or a keyboard. The mobile device 100 comprises a display device 140, a processor 110, a controller 113 of the display device, and an input device 115.

In the present system, the user interaction with and manipulation of the application program rendered on a GUI is achieved using the display device 140, or screen, which is presently a touch panel operationally coupled to the processor 112 controlling the displayed interface.

Processor 110 may control the rendering and/or the display of the GUI on the display device 140 depending on the type of application program, i.e. resident or web-based. Processor 110 may also handle the user entries according to the present method. The user entries to interact with an application program may be provided through interactions with the touch panel 140.

The touch panel 140 can be seen as an input device allowing interactions with a finger of a user or other devices such as a stylus. Touch sensor interface or touch panel 140 may include any suitable circuitry to convert analog signals corresponding to touch input received over its surface into any suitable digital touch input data. Such touch input data can, for example, be used to make selections of portions of the GUI of an AP or draw in continuous sequence on the display device 140 as explained here after. The input received from a user's touch is sent to the processor 110. The touch panel 140 is configured to detect and report the (location of the) touches to the processor 110, that can further characterize the touch input through its shape, length, duration, coordinates . . . It will also interpret the touches in accordance with the application program and the currently displayed GUI. For example, the processor 110 can initiate a task, e.g. a control of the AP to seek a subportion of an hidden portion of an electronic document subsequent to a scrolling input received on the touch panel 140.

The controller 113, e.g. a dedicated processor, may be provided to process input touches locally and reduce demand for the main processor 110 of the mobile device. The touch panel 140 can be based on sensing technologies including but not limited to capacitive sensing, resistive sensing, surface acoustic wave sensing, pressure sensing, optical sensing, and/or the likes. Here after, for simplification purpose, reference will be made to a finger of the user touching panel 140, other devices such as a stylus may be used in place of the user finger.

In the present system, a number of different applications may be provided with the mobile device 100, like AP1 131, AP2 132 and Lock AP 133. AP1 and AP2 may be for instance web applications like news or sports applications. The lock mode of the present system may be controlled by a lock AP or module 133 under the control of the processor 110.

Figure 4B:
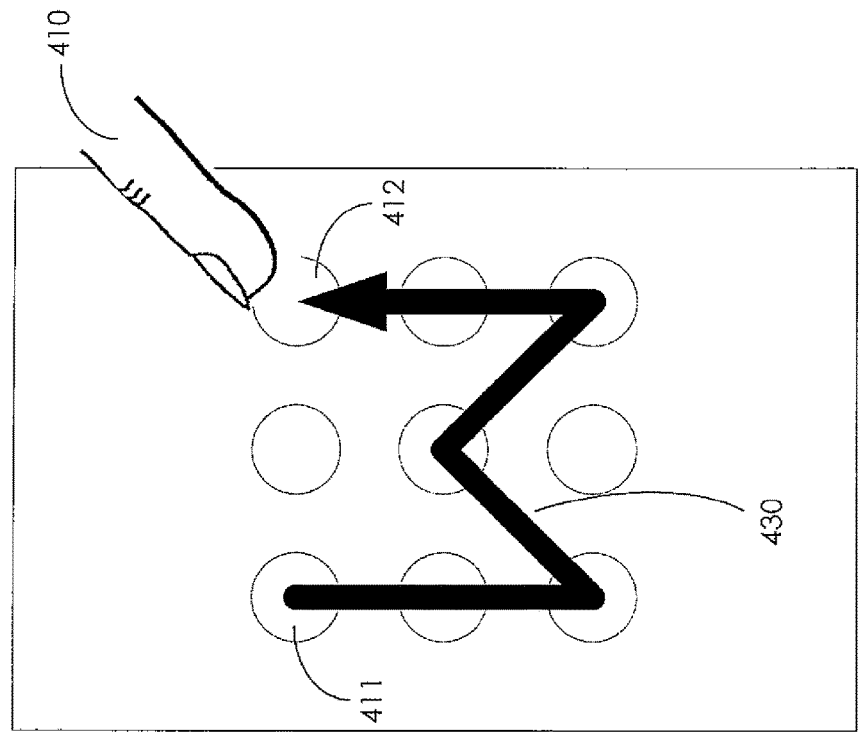
FIGS. 4A-4B show a known lock GUI of an electronic device.
Figure 4A:
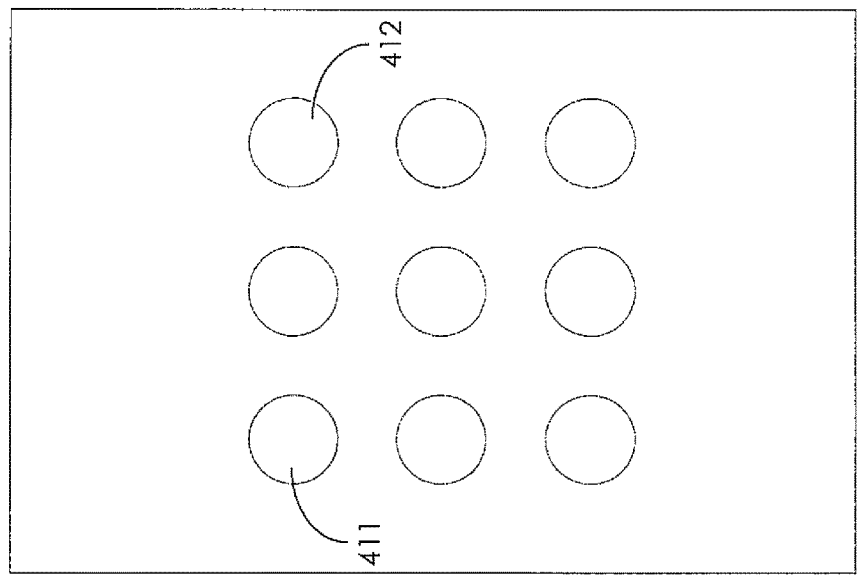

The Lock AP 133 will be arranged to:
request from the user to define a continuous sequence corresponding to the unlock or unlocking sequence. This corresponds to the configuration of the lock mode. The unlocking sequence is characterized with an unlock shape, referred too here after as the predefined shape. When starting configuration of the lock screen mode, the Lock AP 133 may render e.g. a nine circle lock GUI like the known lock interface of FIG. 4A. The user is then invited to enter a continuous gesture or user input to draw a line 230 e.g. joining the bottom left corner circle 211 to the top right corner circle 213. The Lock AP 133 may render a visual feedback to the user by showing the line 230 joining the circles as the user's finger 210 moves diagonally across the lock GUI 200,
save the received continuous sequence as the unlock sequence, as characterized through its length L, and shape (e.g. a series of coordinates on the touch screen for the continuous sequence),
receive from the user association of the unlock sequence to a particular action. Indeed, it is commonly known to use the provided continuous sequence to simply unlock the whole electronic device. The user may be invited to provide several different unlock sequences, each being associated to a particular action. Indeed, a particular sequence may be associated to just unlocking texting or emailing or web browsing. Another sequence may be associated to unlocking the call function or the camera . . .
start the lock mode upon receiving a specific trigger from the user, like the pressing of a specific button on the electronic device, as with known smartphones, or after a certain preconfigured time out,
render the lock screen, e.g. the interface showing the 9 circles as in the known Android™ environment,
detect at the touch screen any user touch inputs having a first shape,
verify if the first shape comprises the predefined shape of the unlock sequence,
in response to detecting that the touch input comprises the predefined shape, confirming authorized access to the processor 110, if detecting further touch input on top of the predefined shape, i.e. before or after the predefined shape.

Provided authorized access is confirmed, i.e. that the provided gesture input has a first shape comprising the predefined shape of the unlock sequence, the processor 110 may execute as mentioned before a particular action determined, at least in part, on the predefined shape, In the proposed system, further touch input must be detected on top of the detection of the predefined shape. The further touch input may correspond to further touch input of a given length or captured during a predefined time, as detailed hereafter. Such further touch input from the user will disguise the actual predefined shape in a much longer continuous user input. Another user witnessing the longer sequence will not be able to guess which part of the sequence actually triggers the predefined action such as discontinuing the lock mode.

Figure 3A:
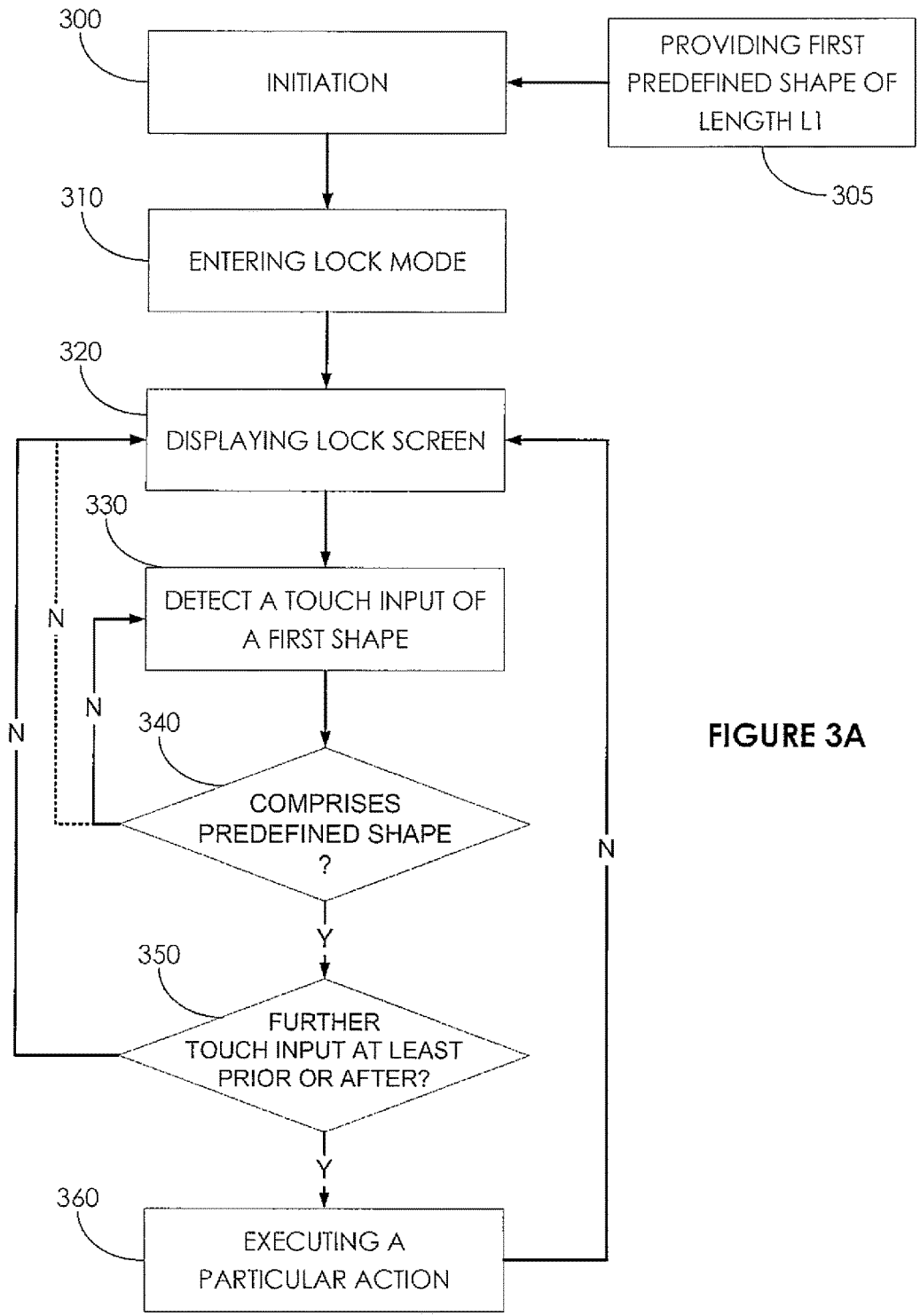
FIGS. 3A-3C, shows exemplary flowcharts in accordance with an embodiment of the present system.

FIG. 3A is a flowchart illustrating an exemplary embodiment of the present method. Flowchart of FIG. 3A will be described in relation with exemplary illustrations of FIGS. 2A and 2B. The present unlock mode is implemented on the mobile device through its processor 110 seen in FIG. 1.

In an initiation act 300, the user trigger the lock AP 133 to configure the lock mode with an unlock sequence. To do so, he will enter in an act 305 a lock sequence 230 through a user touch input using for instance his finger 210 as seen in FIG. 2A. As mentioned before, the processor 110 may, through the lock AP 133, render a visual feedback such as a thick line 230 joining the different circles that the entered unlock sequence crosses. Upon releasing his finger, i.e. discontinuing the touch input, the processor will save the continuous sequence provided before release of the finger as the unlock sequence. An illustration of an unlock sequence may be found in FIG. 2A, wherein the unlock sequence 230 joins diagonally the lower left circle 211 to the upper right circle 212.

In a further act 310, the electronic device will enter the lock mode, either through a user activation, or after a time out for instance. Each time the user will try to re-access the device, the processor 110 will display the known lock interface—as already seen in FIG. 4A—in a further act 320. To trigger the lock interface, different techniques are readily available to the man skilled in the act like pressing of a dedicated button (the same for instance as the one that locks the device), or the sliding of the interface using a touch input in one direction to reveal the lock interface.

In a further act 330, the processor will monitor and detect a touch input having, i.e. characterized with, a first shape. In a further act 340, the processor will verify if the first shape comprises the predefined shape entered in the initiation acts 300-305.

The verifying 340 may be triggered in different ways. In an additional embodiment of the present system, the verifying may be performed as the touch input is received from the user. This may be seen as a verifying "on the fly". This may be triggered from the very beginning of the touch input on the lock screen. Alternatively, the verifying may be triggered once the length of the touch input L1 reaches the length L of the predefined shape.

Figure 3B:
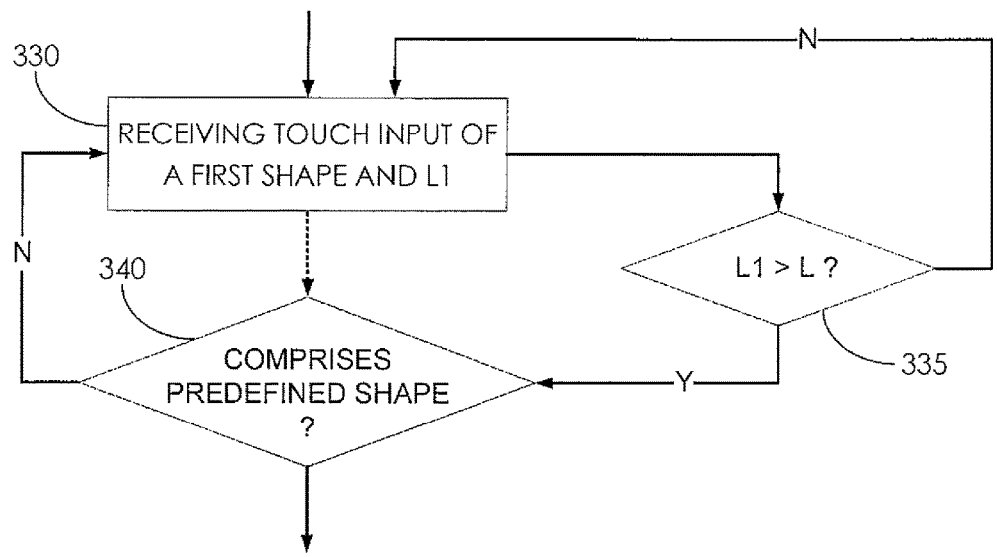

Indeed, in an alternative embodiment of the present system, illustrated in FIG. 3B, the length of the touch input will determine when the verifying is triggered. The predefined shape is of a predefined length L, while the first shape of the user input is of a first length L1. In this embodiment, the verifying 340 is carried out in response to detecting (Yes to act 335) that the first length L1 is at least greater than the predefined length L. In other words, as long as the length of the continuous input from the user has not reached the length L of the predefined shape (No to act 335), the verifying of act 340 will not be carried out, and the processor will monitor the user input in act 330 and its length L1.

Provided the first shape does not comprise the predefined shape (answer No to act 340), the processor will resume with detecting further touch input from the user in act 330 as seen in FIGS. 3A and 3B. This resuming of act 330 will be carried out as long as the first shape does not comprise the predefined shape. If the embodiment of FIG. 3B is implemented, the act 335 is no longer needed once L1 has reached L (dotted line between acts 330 and 340 in FIG. 3B).

In order to avoid looping between acts 330 and 340, in an additional embodiment of the present system (not shown in FIG. 3A nor 3B), the verifying may be carried out for only a predefined amount of time T1. Once T1 is lapsed, and the first shape still does not comprise the predefined shape (answer No to act 340), the processor 110 will control the Lock AP 133 to return to the lock screen in act 320 (dotted lines from act 340 to act 320 in FIG. 3A).

Alternatively, the user may decides to discontinue his touch input. Provided the predefined shape still cannot be found in the first shape, the processor will also control the Lock AP 133 to return to the lock screen in act 320 (dotted lines from act 340 to act 320 in FIG. 3A).

Figure 3C:
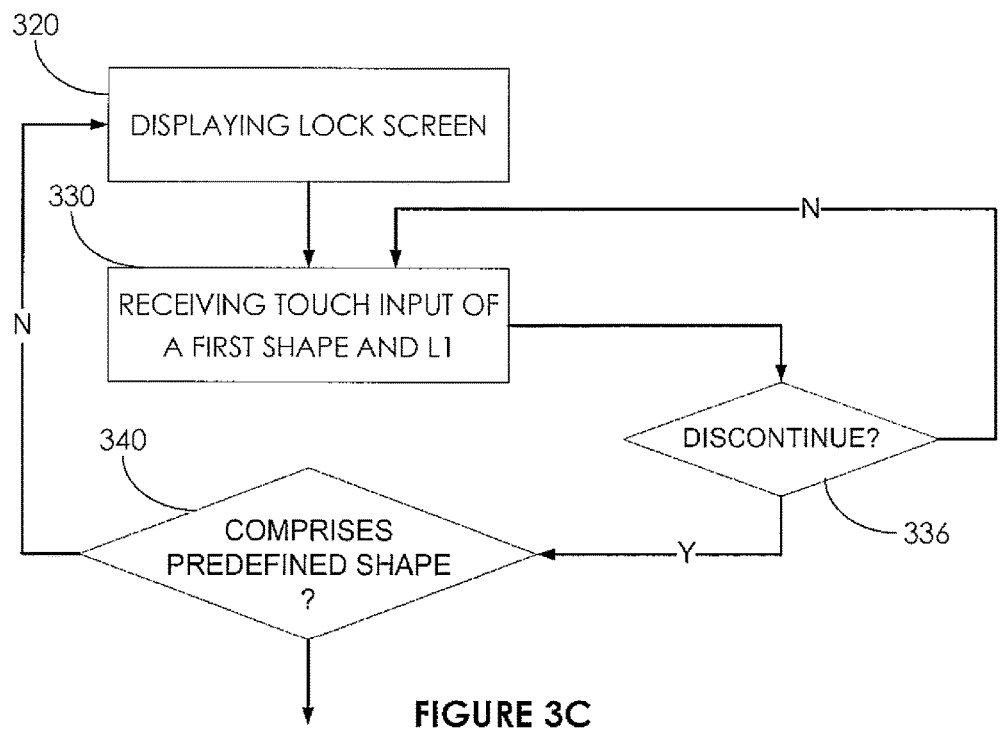

In an alternative embodiment of the present system, illustrated in FIG. 3C, the verifying of act 340 may be carried out only in response to detecting a discontinuation of the touch input in act 336. Indeed, as in known methods, the verifying 340 may be carried out only when the finger is released from the screen, i.e. that the touch input is discontinued (Yes to act 336). Contrary to the previous embodiments, such an alternative one allows to postpone the comparison after the touch input from the user is complete (according to the user). As long as the touch input is continued (No to act 336), the processor will further monitor the user touch input in act 330. In this specific embodiment of FIG. 3C, if the predefined shape cannot be found in the first shape (No to act 340), the processor will control the Lock AP 133 to return to the lock screen in act 320 as seen in FIG. 3B.

In the present system, the user will need to provide an additional sequence on top of the predefined sequence. In other words, once the processor has identified the predefined sequence in the user input, it will monitor if further touch input is provided by the user either before or after the unlock sequence (corresponding to the predefined shape). In order to do so, it will verify in act 350 if the further touch input is found on top of, i.e. at least prior or subsequent, the predefined shape.

A low security approach would consist in verifying if further touch input of a predefined length L2 is found before the unlock sequence. In this approach, as soon as the predefined shape is detected in the first shape, the processor will trigger the particular action the moment the first shape comprises a portion longer than L2 prior the unlock sequence.

An approach with increased security would consist in verifying if further touch input of a predefined length L3 is found after the unlock sequence. In this approach, once the predefined shape is detected in the first shape, the processor will delay the particular action by waiting further touch input of a length L3.

The present system may verify that further touch inputs of respective length L2 and L3 are found prior and subsequent the unlock sequence in the user input. An illustration of such an implementation may be found in FIG. 2B, wherein the unlock sequence 230 of FIG. 2A is surrounded by a first sequence 232 and a second sequence 234 of length respectively L2 and L3 (here illustrated as L2=L3=distance between three consecutive circles on a side of the unlock pattern). In this illustration, the processor 110 is configured to detect further touch input of a length L2=L3 respectively prior and subsequent the unlock sequence 230 before authorizing the particular action.

In an alternative embodiment of the present system, the further touch input may be monitored for a second predefined amount of time T2 after the unlock sequence is found in the first shape. This is illustrated in FIG. 2B, wherein the sequence prior to the unlock sequence may or may not be monitored, and the sequence 234 after the unlock sequence corresponds to how far the user's finger 210 may go in the second predefined amount of time T2.

The present system may combine the monitoring of a sequence of length L2 prior to the unlock sequence, while monitoring further touch input for the time T2 after the unlock sequence.

Once further touch input is found prior or/and after the unlock sequence (answer Yes to act 350), the processor 110 will execute a particular action determined, at least in part on the predefined shape.

Provided no further touch input is found according to the act 350, the processor will configure the Lock AP 320 to display the lock screen again.

In the present description, reference was made to an lock screen GUI comprising nine circles (arrange 3 by 3) to help the user configure and draw an unlocking sequence. A more complex 2D sequence may be provided by the user either using a grid as a guidance or no grid at all. The identification of the predefined shape in the provided user input may then use some confidence margin to determine if the provided shape is sufficiently similar to the predefined shape. The verifying of act 340 then encompasses if the first shape comprises the predefined shape to a predefined degree of confidence. Comparison software may be used for the verifying act 340 and are beyond the scope of the present system.

Figure 5A:
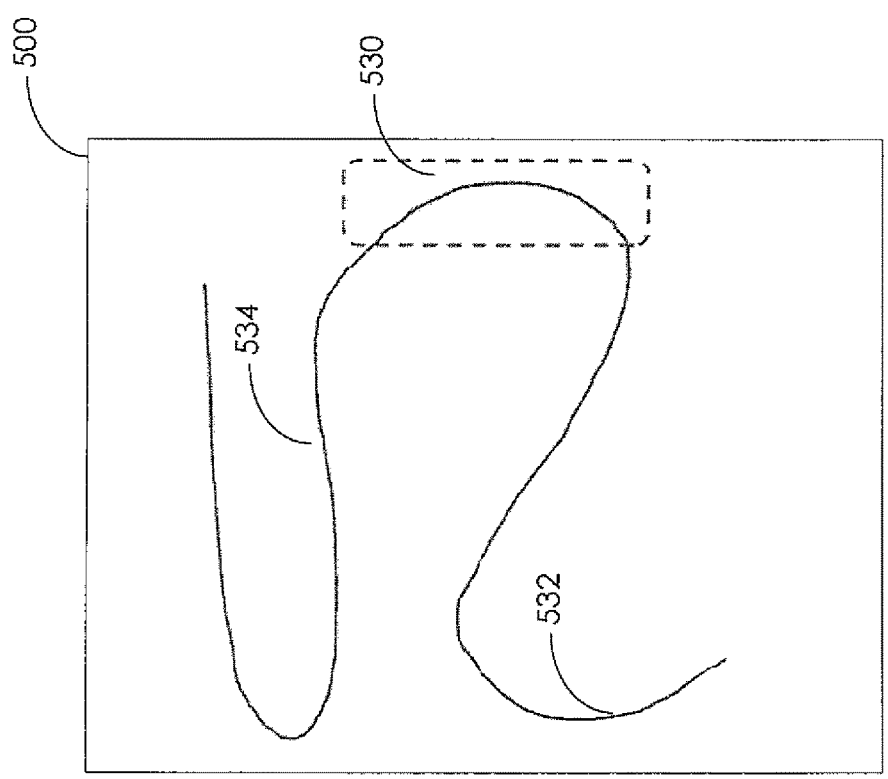
FIGS. 5A-5B shows unlock sequences according to the present system.
Figure 5B:
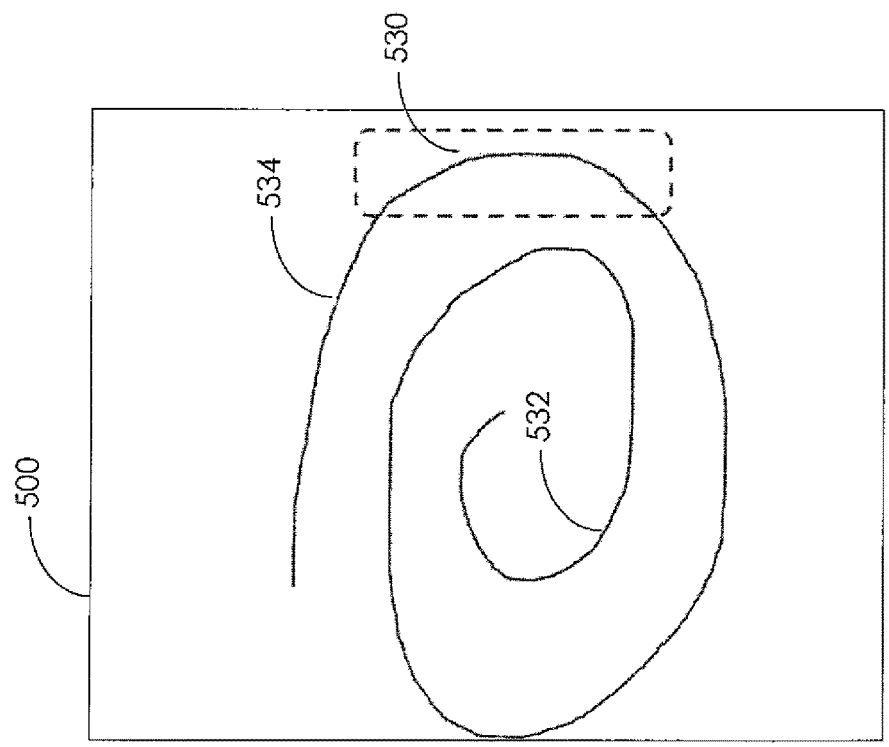

More complex 2D sequences are illustrated in FIGS. 5A-5B. As seen in these figures, a common sequence 530 is surrounded by very different sequences prior and after the unlocking sequence 530. In FIG. 5A, the additional sequences 532 (prior) and 534 (after) to the unlocking sequence are of similar length. The shape of the unlocking sequence will be monitored. In an additional embodiment of the present system, the processor 110 may also monitor the absolute position on the touch interface of the unlocking sequence as comprised in the user input. In other words, if the user reproduces the predefined shape, but in a different position than the one initial entered by the user during the initiation act 300, the device will consider the access as unauthorized and return to the lock screen. As can be seen from FIGS. 5A and 5B, the unlocking sequence 530 are substantially located at the same place within the touch interface 500 on both figures. Alternatively, only the shape of the unlocking sequence may be monitored, regardless of its position as the user draws the shape on the interface 500.

The user input in FIG. 5B presents a fairly longer sequence 532 prior to the unlocking sequence 530. Yet the unlocking will still be authorized. Such a complex shape over all (including the 3 sequences 532, 530 and 534) would be virtually impossible for an undesired witness to reproduce.

The present embodiments were illustrated mostly using reference to touch inputs on a touch interface. The presents teaching may easily be implemented using a pointing device a stylus.

Finally, the above discussion is intended to be merely illustrative of the present system and should not be construed as limiting the appended claims to any particular embodiment or group of embodiments. Thus, while the present system has been described with reference to exemplary embodiments, including user interfaces, it should also be appreciated that numerous modifications and alternative embodiments may be devised by those having ordinary skill in the art without departing from the broader and intended spirit and scope of the present system as set forth in the claims that follow.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or an preceding an element does not exclude the presence of a plurality of such elements, c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A computer-implemented method for executing an action on an electronic device, comprising:
   outputting, at a touch screen of the electronic device, a lock screen view configured to prevent unauthorized or inadvertent access to the electronic device, access being conditioned to a predefined shape of a user touch input, which is saved by the electronic device in a memory; and
   while the lock screen view is displayed at the touch screen:
      detecting, at the touch screen, a first touch input having a first shape;
      verifying if the first shape comprises both the predefined shape and a further touch input prior or subsequent to the predefined shape, the further touch input disguising the predefined shape; and
      when the first shape comprises the predefined shape and the further touch input, executing, by the electronic device, a particular action determined, at least in part on the predefined shape.

2. The method of claim 1, wherein the predefined shape is of a predefined length, the first touch input being of a first length, the verifying is carried out in response to detecting that the first length is at least greater than the predefined length.

3. The method of claim 1, wherein the verifying is carried out in response to detecting a discontinuation of the first touch input.

4. A method of claim 1, wherein the verifying is performed as the first touch input is received.

5. The method of claim 1, wherein the verifying is carried out for a first predefined amount of time.

6. The method of claim 1, wherein detecting further touch input subsequent the predefined shape comprises:
   detecting the further touch input for a second predefined amount of time.

7. The method of claim 1, wherein detecting the further touch input at least prior or subsequent the predefined sequence comprises:
   detecting the further touch input of a predefined length.

8. An electronic device for executing an action, the electronic device comprising a processor arranged to:
   output, at a touch screen of the electronic device, a lock screen view configured to prevent unauthorized or inadvertent access to the electronic device, access being conditioned to a predefined shape of a user touch input; and
while the lock screen view is displayed at the touch screen, the processor is further arranged to:
   detect, at the touch screen, a touch input having a first shape;
   verify if the first shape comprises both the predefined shape and a further touch input prior or subsequent to the predefined shape, the further touch input disguising the predefined shape; and
   when the touch input comprises the predefined shape and the further touch input, execute a particular action determined, at least in part on the predefined shape.

9. A non-transitory computer-readable medium comprising a program product stored thereon and executable by a computer in the form of a software agent including at least one software module set up to implement a method for executing an action on an electronic device, the method comprising:
   outputting, at a touch screen of the electronic device, a lock screen view configured to prevent unauthorized or inadvertent access to the electronic device, access being conditioned to a predefined shape of a user touch input, which is saved by the electronic device in a memory; and
while the lock screen view is displayed at the touch screen:
   detecting, at the touch screen, a first touch input having a first shape;
   verifying if the first shape comprises both the predefined shape and a further touch input prior or subsequent to the predefined shape, the further touch input disguising the predefined shape; and
   when the first shape comprises the predefined shape and the further touch input, executing, by the electronic device, a particular action determined, at least in part on the predefined shape.

10. The method of claim 1, wherein detecting the further touch input at least prior or subsequent to the predefined shape comprises:
    detecting the further touch input, which is a part of the first shape at least prior or subsequent to the predefined shape.

11. The device of claim 8, wherein detecting the further touch input at least prior or subsequent to the predefined shape comprises:
    detecting the further touch input, which is a part of the first shape at least prior or subsequent to the predefined shape.

12. The non-transitory computer-readable medium of claim 9, wherein detecting further touch input at least prior or subsequent to the predefined shape comprises:
    detecting the further touch input, which is a part of the first shape at least prior or subsequent to the predefined shape.

* * * * *